(12) United States Patent
Levingston

(10) Patent No.: US 8,333,501 B2
(45) Date of Patent: Dec. 18, 2012

(54) BALANCE SPRING, REGULATED BALANCE WHEEL ASSEMBLY AND METHODS OF MANUFACTURE THEREOF

(75) Inventor: Gideon Levingston, Grasse (FR)

(73) Assignee: Carbontime Limited, Bristol (GB)

( * ) Notice: Subject to any disclaimer, the term of this patent is extended or adjusted under 35 U.S.C. 154(b) by 1144 days.

(21) Appl. No.: 11/914,322

(22) PCT Filed: May 4, 2006

(86) PCT No.: PCT/GB2006/001637
§ 371 (c)(1),
(2), (4) Date: May 14, 2008

(87) PCT Pub. No.: WO2006/123095
PCT Pub. Date: Nov. 23, 2006

(65) Prior Publication Data
US 2009/0116343 A1    May 7, 2009

(30) Foreign Application Priority Data

May 14, 2005   (GB) .................................. 0509886.8
Nov. 9, 2005   (GB) .................................. 0522838.2

(51) Int. Cl.
*G04B 17/04* (2006.01)
(52) U.S. Cl. ........................................ 368/175; 368/177
(58) Field of Classification Search .................. 368/124, 368/127, 175–178, 125; 264/400; 267/166–168
See application file for complete search history.

(56) References Cited

U.S. PATENT DOCUMENTS

| 209,642 | A | | 11/1878 | Berlitz |
| 455,787 | A | | 7/1891 | Bilgram |
| 1,974,695 | A | | 9/1934 | Straumann |
| 2,568,326 | A | | 9/1951 | Dubois |
| 3,187,416 | A | | 6/1965 | Tuetey et al. |
| 3,547,713 | A | | 12/1970 | Steinemann et al. |
| 3,624,883 | A | | 12/1971 | Baehni |
| 3,683,616 | A | | 8/1972 | Steinemann et al. |
| 3,735,971 | A | | 5/1973 | Steinemann |
| 3,773,570 | A | | 11/1973 | Steinemann et al. |
| 3,813,872 | A | | 6/1974 | Nakagawa et al. |
| 3,931,491 | A | * | 1/1976 | Stumpf .................... 219/121.67 |
| 4,260,143 | A | | 4/1981 | Kliger |
| 4,765,602 | A | | 8/1988 | Roeseler |

(Continued)

FOREIGN PATENT DOCUMENTS

CH    34141    3/1906

(Continued)

OTHER PUBLICATIONS

Machine translation of FR 2136084.*

(Continued)

*Primary Examiner* — Vit W Miska
(74) *Attorney, Agent, or Firm* — Stites & Harbison PLLC; Douglas E. Jackson

(57) ABSTRACT

A balance spring comprising a flat spiral coil and a non-elastic inner attachment part formed by laser beam cutting. The spring has an outer attachment plate in the plane of the coil formed with a channel which receives and protects the outer winding of the coil. The outer attachment plate has a curved attachment edge which allows the location of the oscillator dead point to be varied without affecting spring frequency.

11 Claims, 6 Drawing Sheets

U.S. PATENT DOCUMENTS

| | | | |
|---|---|---|---|
| 5,043,117 A | 8/1991 | Adachi et al. | |
| 5,227,606 A * | 7/1993 | Weeks et al. | 219/121.67 |
| 5,678,809 A | 10/1997 | Nakagawa et al. | |
| 5,881,026 A | 3/1999 | Baur et al. | |
| 5,907,524 A | 5/1999 | Marmy et al. | |
| 6,329,066 B1 | 12/2001 | Bauer et al. | |
| 6,357,733 B1 | 3/2002 | Wulz et al. | |
| 6,371,464 B1 * | 4/2002 | Porche et al. | 267/166.1 |
| 6,666,575 B2 | 12/2003 | Scheufele | |
| 6,705,601 B2 | 3/2004 | Baur et al. | |
| 6,843,594 B1 * | 1/2005 | Moteki et al. | 368/140 |
| 7,018,092 B2 | 3/2006 | Muller | |
| 7,077,562 B2 | 7/2006 | Bourgeois et al. | |
| 7,213,966 B2 | 5/2007 | Lambert et al. | |
| 7,503,688 B2 | 3/2009 | Hessler et al. | |
| 7,726,872 B2 * | 6/2010 | Levingston | 368/175 |
| 2002/0070203 A1 | 6/2002 | Serex | |
| 2002/0167865 A1 | 11/2002 | Tokoro et al. | |
| 2002/0191493 A1 * | 12/2002 | Hara | 368/140 |
| 2004/0174775 A1 * | 9/2004 | Muller | 368/177 |
| 2006/0055097 A1 | 3/2006 | Conus et al. | |
| 2006/0225526 A1 | 10/2006 | Levingston | |
| 2007/0140065 A1 | 6/2007 | Levingston | |

FOREIGN PATENT DOCUMENTS

| | | |
|---|---|---|
| DE | 19651320 | 6/1998 |
| DE | 19651321 | 6/1998 |
| DE | 19651322 | 6/1998 |
| EP | 0393226 | 10/1990 |
| EP | 0732635 | 9/1996 |
| EP | 1039352 | 9/2000 |
| EP | 1 513 029 | 3/2005 |
| EP | 1 515 200 | 3/2005 |
| FR | 2 136 084 | 12/1972 |
| GB | 1 180 762 | 2/1970 |
| JP | 64-006537 | 1/1989 |
| JP | 1110906 | 4/1989 |
| JP | 1110907 | 4/1989 |
| JP | 1110908 | 4/1989 |
| JP | 1110909 | 4/1989 |
| JP | 07138067 | 5/1995 |
| JP | 09257069 | 9/1997 |
| JP | 11147769 | 6/1999 |
| WO | WO 96/14519 | 5/1996 |
| WO | WO 01/01204 | 1/2001 |
| WO | WO 2005/017631 | 2/2005 |

OTHER PUBLICATIONS

Dictionnaire Professionel Illustre De L'Horlogerie, Chaux De Fonds; Chambre Suisse D'Horlog, CH; XP-002313758; 1961.

Guillaume, Charles E.; Invar and Elinvar; Nobel Lecture; Dec. 11, 1920.

Levingston, Gideon; Horological Journal; A New Material for Balance Springs; Jul. 2004.

Randall, Anthony; Glass Balance Springs—Part 1; http://www.worldtempus.com/wt/1/2659.

Randall, Anthony; Glass Balance Springs—Part 2; http://www.worldtempus.com/wt/1/2660.

Edwards, Evan; Carbon Fibre Pendulum Rods; Horological Journal; Jun. 2000.

Stephen, Richard; Carbon Fibre Rods for Pendulums; Horological Journal; Feb. 2000.

English translation of Office Action for JP Patent Application No. 2008-511771, Dec. 15, 2011, Japanese Patent Office.

Office Action for Japanese Application No. 2008-511771, Jul. 31, 2012, Japanese Patent Office.

* cited by examiner

BALANCE SPRING, REGULATED BALANCE WHEEL ASSEMBLY AND METHODS OF MANUFACTURE THEREOF

FIELD OF THE INVENTION

The present invention relates to refinements concerning balance wheel mass and timing appendages, and the shape of and processes for making balance springs previously introduced by the present inventor in WO 2004/008259 and WO 2005/040943.

BACKGROUND OF THE INVENTION

The balance wheel as is found in a horological mechanism or other precision instrument is required to oscillate isochronically providing the required inertia to the balance spring's restoring couple. For a given restoring couple of the balance spring the inertia of the balance may be found by adjusting the centre of its gyratory mass. This is the case in high quality time keepers which have a fixed active length of balance spring and therefore a fixed restoring couple at a given temperature.

SUMMARY OF THE INVENTION

Balance Spring Manufacture

In a first aspect, the present invention relates to refinements to the balance spring manufacturing process, particularly the forming and finishing stages of the balance spring's manufacture.

A first refinement provides a further method of forming spiral balance springs. This technique is particularly but not exclusively suitable for ceramic or other material considered isotropic and in a state which may embody its final density and intrinsic mechanical characteristics. At its most general, the method relates to cutting the spiral (e.g. a flat Archimedes i.e. regularly developing spiral) made up of a plurality of coils from a layer of the spring material using a laser beam. Beam cutting permits extremely precise shaping of the spiral, and the first refinement of the invention exploits this by cutting from a layer of spring material a balance spring whose inner attachment part, i.e. the part for attaching to a balance wheel in an oscillator mechanism, is non-elastic. In other words, the conventional elastic split ring collet and other known elastically behaving inner attachment parts are avoided. The benefits of this configuration of balance spring is discussed with reference to the third aspect below.

Thus, the present invention may provide a method of forming a balance spring for a horological oscillator mechanism or other precision instrument comprising forming one or more layers of balance spring material; generating a laser beam to penetrate the layer or layers and cut therethrough; and directing the laser beam at the layer or layers and causing relative movement therebetween so that the laser beam cuts out a balance spring comprising a spiral and a non-elastic inner attachment part from the layer or layers of spring material.

Preferably, the inner attachment is cut integrally with the spiral. However, it is also possible to cut these pieces separately and attach (e.g. fuse or weld) them together to form the spring.

Preferably, the laser beam cuts out the central space of the spiral so that the outer coils remain attached to the layer of spring material e.g. for further production processes. These processes may include the coating of the non crystalline form of carbon for example, with a ceramic material such as boron nitride, silicon carbide, silicon dioxide or other ceramic, or polymer or form of carbon to adjust its elastic performance. Coating with one or other combinations of materials mentioned in WO 2004/008259 may also take place.

The material cut away from the spiral may itself have a spiral shape and be used in a balance spring.

The spring material may be presented in either flat single or multiple stacked sheet form with or without separating layers. A specific form of photon or ionic beam may be used, preferably cooled laser of deep performance depth and fine beam width. The relative movement is to cause removal of the regular developing spiral space found within the spiral spring form when the direction of beam is preferably perpendicular to the planar surface of the sheet or sheets of material. The beam source may or may not remain stationary. Preferably the spring material is movable e.g. rotates and traverses through the beam path.

Once the spiral space has been made the remaining spiral material form defines the balance spring and when the sheets are unstacked individual springs may be removed from their remaining surrounding material or left connected within their individual sheet surrounds for further production processes, as explained above.

The same technique may be applied to a cylinder or other initial shape of the material where the laser performs perpendicular to the circular end of the cylinder for example, and cuts into the length dimension of the material form. The laser may cut through the edge of the cylinder or not as appropriate. Preferably, a second laser or other cutting operation is performed perpendicular to the axis of rotation of the cylinder to cut off layers (e.g. disc-like sections) which correspond to spiral springs with or without their material surround as described in WO 2005/040943.

The beam cutting may use any precision laser or ionic beam technique, or electro, mechanical, ultra sound, chemical or vapour means or a combination of these precision material removal techniques. Preferably, cooled, deep cutting excimer, or other cooled or non cooled laser techniques e.g. YAG lasers, copper vapour laser, $CO_2$ laser are used, more preferably in conjunction with conventional beam deflection techniques, so that the balance spring may also be formed from the same piece of material as the balance wheel, balance staff, roller and impulse pin. The whole ensemble may therefore be shaped from the same initial piece of material and remaining so unified, without requiring recourse to assembly of individual parts as is necessary in the present state of the art.

A second refinement relates to the method (disclosed in WO 2005/040943) for the production of flat spiral balance springs is described wherein balance spring material (continuous carbon fibre, ceramic fibre, ceramic, polymer or carbon family) is wound in a tight cylindrical roll, with an interspacing material separating one coil from another having equal thickness over its length. The inventor has now found an expedient method for achieving an extra spacing for the outermost coil, which later facilitates its attachment in the mechanism, where the continuous carbon fibre, ceramic fibre, ceramic, polymer or carbon family spring is made with the interspacing and a non adhesive agent.

According to this second refinement, the outermost coil or coils may be spaced apart from the inner ones at a given radius by locating a spacer element between the inner and outer coils of the rolled preparation as described in WO 2005/040943, e.g. by inserting the rolled preparation into a cylinder of suitable material, e.g. metal or polymer or organic fibre material such as wood paper or cardboard, and has an inner surface shaped such that the inner coils are wound inside the spacer element (e.g. cylinder) and kept in regular development with identical interspacing.

The spacer element is preferably shaped such that the roll of spring material and its interspacing material fills it and is compressed in it. The spacer element includes an opening, e.g. a slit in the cylinder's wall to permit the spring material to exit to the outside of the spacer element. Preferably the slit is parallel to the axis of rotation of the cylinder. The spacer element preferably has an outer surface shaped such that the spring metal can continue to be wound outside the spacer element (preferably in the same sense as the inside winding). The outer winding or windings are preferably then bound and made secure around the outside of the spacer element (cylinder) e.g. with a tape or fastening agent or cover device such as a further cylinder slipped over the whole ensemble.

In this arrangement the thickness of the spacer element (distance between inner and outer surfaces thereof) may provide a spacing between the inner series of coils and the outermost coil or coils. The passage through the opening in the spacer element preferably forces the spring material to adopt a course which provides a wider spacing between the coils on the outside of the cylinder from those on the inside, whilst still providing for the finished spring to dilate or contract concentrically.

The interspacing between adjacent coils is preferably removed in subsequent heat treatment stages leaving a prepared roll of spring material to be sliced to provide individual springs, as is previously described in WO 2005/040943. The spatial relationship between inner and outer coils is obtained during or before these heat treatment steps according to this refinement of the invention.

For the machining steps after heat treatment, the spring material may need to have its intercoil volume filled with a support material, e.g. polymer foam (foams used for buoyancy in boats have been found suitable) so that a degree of rigidity and shock absorbency can be imparted to the prepared roll.

Preferably, a soluble polymer or other removable material is introduced between the coils of the e.g. by injection, immersion or other suitable method. When this process is complete and the support material is fully cured, the cutting (machining) process may take place.

In a third refinement, the present invention proposes a further preparatory method of forming one or more balance springs. This aspect is particularly but not exclusively suitable for ceramic or carbon fibre in carbon matrix springs.

Accordingly, there may be provided a method of forming a balance spring for a horological oscillator mechanism or other precision instrument comprising introducing balance spring material in its green state into a channel formed in a surface of a flexible interspace material; rolling the interspace material to cause the channel to form a coiled configuration, adjacent winds of the coil being separated by a layer of the interspace material; treating the rolled material to transform the balance spring material from its green state to its final form; and removing the interspace material. The interspace material is preferably a flat layer, e.g. a preformed sheet which is pre-prepared with precision made channels which run parallel to one another. The channels may be made by a mechanical engraving or rolling process or by a photolitho and chemical etching process or by a precision material removal means by chemical, water, electrical, laser or other beam treatment means of any wavelength of the known spectrum. The cross section of the channel is preferably the same as that of the spring and the channels may be formed on one or both surfaces of the sheet. Preferably, after the spring material is introduced into the channels in the sheet the whole sheet is then wound around a small diameter core e.g. a cylinder which is preferably laid perpendicular to the channels at one end of the sheet. This core may intentionally become bonded to the material in the channels. The subsequent cylindrical roll of material may then be treated such that the material laid on the sheet in the 'green state' then passes to a subsequent transformation stage which may include one or more of the processes of polymerisation, carbonisation, sintering, vitrification or graphitisation.

Once the individual springs including supporting material have been sliced from the prepared cylinder they may preferably be worked in batches to desired height by preferably precision mechanical methods as are known in the precision preparation of watch jewels in the industry by grinding, lapping and polishing with suitable abrasives, or alternatively by one or more of the methods of finely controlled precision material removal consisting of chemical, water, electrical, laser or other beam treatment means of any wavelength of the known spectrum.

The springs including supporting material may be fixed in batches to supports which may or may not have precision cut recesses of precise depth which are presented to the lapping head or material removal tool or interface such that all components in the batch are simultaneously or consecutively worked to the same exact dimensions.

When the dimensioning stages and polishing stages are complete, the intercoil supporting material can be removed by either heat, chemical, electrical, mechanical, water, or beam treatment means of any wavelength from the known spectrum. Further coatings and treatment may take place if required at this stage.

In a fourth refinement, a continuous carbon fibre balance spring in a glassy carbon matrix may be made by coating or inserting the carbon fibres in a sleeve of polymeric or other suitable material which provides the required density of carbon in the finished matrix, i.e. once the non-carbon material has been evacuated in the processing treatments.

In the case of a polymer sleeved, preferably continuous fibre preparation, the shaping of the spring is performed when the polymer (whether thermoplastic or thermoset) is in its physically plastic state. The sleeved fibre preparation may itself be externally coated with a non adhering agent so that adjacent coils of the spring do not adhere to one another, or the sleeving itself may be of non adherent characteristic. This preparation of material configuration may be wound so that adjacent coils of any one spring may touch one another. The sleeved fibre preparation may be wound singly on an arbor or mandrel or plurally so that many are formed on a common mandrel.

Alternatively the prepared sleeved fibres may be placed in a prepared channelled non-adhering separating sheet with a suitable small diameter core laid across the sleeved fibre ends as a mandrel for the cylindrical roll as described above.

The thermal transformation process preferably by one or more of methods of carbonisation, pyrolisation, graphitisation, or vitrification of the polymer reduces the overall volume of the component providing a greater separation between the adjacent coils. Thus the coil's spacing can be determined by two methods, the sleeve thickness and the intercoil spacing material. The polymer composition of the sleeve allows for more or less volatile non carbon material to be evaporated away in this process and thus the resulting space between coils is determined.

It is also desirable to be able to perform a method of flattening the spring should this be required at the appropriate stage in its manufacture. This can be accomplished by heating the spring or springs when placed between two smooth preferably parallel plates of a suitable non adhering material which may be drilled to receive any protruding core attached to the centre of the spring. In so doing the upper edge surfaces and lower edge surfaces of the coils are urged to occupy a position in their relative parallel planes and the spring in its final form will thus dilate and contract within the volume represented between these two parallel planes.

It is also expedient to ensure the regular development of the spring from its centre. This may be performed by using two parallel plates as above but with the addition of a 'v' shaped spiral master groove in each plate, the plate grooves being identical mirror images of one another which encourage the upper surface and lower surface of the spiral spring to follow the true course of the inscribed 'v' shaped groove when the two plates are brought together with the spring between them.

The spring may then be heated, chemically or electrically treated or treated by beam treatment of any wavelength of the known spectrum. The realignment and tempering or adjusting of the spring and or its terminal curves or its physical characteristics may also preferably be performed in this way.

Balance Wheels

In the published patent application WO 2005/040943, the present inventor described mass appendage assemblies for use with low thermal expansion non-magnetically sensitive balance wheels how a part of the appendage assembly should provide for the adjustment of the centre of gyratory mass of the balance wheel.

This has been accomplished previously by the use of laterally placed peripheral screws and or washers, or eccentric screws or eccentric 'c' shaped weights fixed on pegs or in blind holes perpendicular to the planar balance wheel surface.

A second aspect of the present invention relates to the case where the balance spring has a slight near linear and 'abnormal', or positive, Young's modulus evolution with a rise in temperature as divulged in the above mentioned publications.

At its most general, the second aspect of the present invention proposes mass appendages which are receivable in corresponding bores formed in a balance wheel and which are insertable in the bore to be securable therein e.g. by friction fit, or expansion or adhesion. Thus, additional attachment elements e.g. screws or pins are not required. The second aspect of the invention may therefore provide a balance wheel assembly for use in a horological oscillator mechanism, the balance wheel assembly having a planar balance wheel for isochronically oscillating with a balance spring; and a plurality of mass appendages mountable on the balance wheel to adjust its centre of gyratory mass, wherein the balance wheel has a bore formed therein for each of the mass appendages, and each mass appendage is receivable in its corresponding bore and securable to the inner wall thereof. Preferably, the mass appendage is expandable from a mounting state in which it is receivable in its corresponding bore to a normal state in which it is securable e.g. by friction fit in its bore. Each appendage may therefore expand to be gripped by its bore in the normal state.

Preferably the plurality of (two or more) mass appendages are situated to give equipoise to the balance wheel. Preferably but not exclusively the bores are formed substantially perpendicular to the plane of the balance wheel.

Preferably, each mass appendage comprises a tubular setting in which a regulating mass is received. The setting is preferably arranged to expand to secure the mass appendage in its bore.

The setting preferably has a slit through its wall in the direction parallel to its tubular axis. The setting preferably has a slight recess perpendicular to its tubular axis and this recess is preferably cut into the outside circumferential surface of the tube.

In the mounting state, the setting is let into its corresponding bore in the balance wheel. The bore is preferably a hole made through the balance wheel from one planar side to the other (preferably co-planar) side. The recess made e.g. circumferentially in the wall of setting is preferably so positioned as to allow for the setting to elastically expand and secure itself in the appropriately dimensioned hole. The recess in the setting, or the hole in the balance wheel may preferably but not exclusively be lined or coated or otherwise provided with a layer of material which as well as providing increased adherence, also allows for the absorption of the mechanical and or thermal expansion of the setting assembly.

Alternatively or additionally the regulating element may be inserted directly into a hole through the balance wheel itself without a setting.

The regulating element is preferably (but not exclusively) insertable into the setting or balance wheel by screwing. In other words, the regulating element may be screwed into the setting or balance wheel by means of a screw thread e.g. cut over its whole cylindrical length. Screwing the regulating element into the setting may cause further expansion of the setting which is therefore held fixed by its incapacity to contract; the regulating element is likewise firmly held in place by its screw thread and the counteraction with the inherent elasticity of the setting 6.

The regulating element may have a screw head and/or may be of cylindrical form, the screw or cylinder being drilled eccentrically to its centre of rotation in the axis parallel to the axis of its rotation either throughout all or some of its length. The passage formed by this drilling preferably breaks through the edge of the cylindrical form thereby providing a means (by slight bending out of the cusps formed) of increasing or decreasing the friction of the threaded contact of the regulating element with its setting. The passage may be cut to remove mass once the appendage assembly is in situ by means of beam treatment, laser or otherwise of any wavelength of the spectrum or by plasma or anodic erosion.

In the case of a screw with a head, the eccentrically drilled passage may preferably pierce the head of the screw. Whether the regulating element is of screw head type or plain cylindrical type, the regulating element's eccentrically drilled passage may serve as an aperture in which may be inserted a specially shape tool for the rotational adjustment, insertion and removal of the regulating element into or from the setting or the balance wheel.

In order that the required mass may be found to supply the correct inertia for the oscillator system, a rim may be provided on either the top or the bottom or both ends of the setting tube and this may be shaped so as to encourage efficient airflow over the appendage surface to reduce air resistance.

The head of the regulating element may also be of a dimension that allows for the addition of mass also being so formed as to encourage efficient airflow over its surface.

Furthermore the head of the regulating element or the rim of the setting may be of shape that is eccentric and provide not only for the mass adjustment of the balance wheel but also for residual temperature compensation in the case where the balance spring is of 'normal', or negative, Young's modulus evolution. The eccentrically oriented regulating element head or setting rim may be positioned to shift mass towards the centre of rotation decreasing the inertia of the balance wheel with a rise in temperature and vice versa.

Preferably, the assembly is constructed so that the appendages do not protrude either above or below the (preferably co-planar) surfaces of the balance wheel but are retained within the thickness between the upper and lower co-planar surfaces.

The assembly may also be inserted into the edge of a balance wheel in the lateral position radial to the centre of rotation and lying parallel to the planar surface of the balance wheel. In this case the regulating element regulates the gyratory mass in the radial axis and does not necessarily need to be drilled. Alternatively a combination of regulating elements might be used in both the radial and trans co-planar directions.

The regulating element may be radially fixed at the rim of the balance wheel with low thermal expansion; the setting may have an extendible portion that projects e.g. along a radial bore towards the centre of rotation of the balance wheel. The extendible portion preferably provides residual thermal compensation. The extendible portion may be so shaped as to carry a concentration of mass at its inner-most end but is not restricted to this configuration. The material of the regulating element is preferably one with a coefficient of thermal expansion which is greater than that of the balance wheel.

Balance Spring Shape

A third aspect of the present invention relates to the shape of balance spring inner and outer terminal portions and to methods of fixing the balance spring within the oscillator system of a mechanical time keeper or other precision instrument.

The problems to be overcome in the present generation of balance wheel and balance spring oscillator systems require the use of new materials which overcome present day magnetic and thermal fluctuations as well as the intrinsic inaccuracies in the manufacturing and assembly process.

The balance spring in conventional use is of ferro-nickel alloy and is of rectangular cross section and its operating length and thus the oscillator's frequency is defined by the position at which the spring is attached to the watch frame. This is conventionally accomplished by pinning, gluing or welding the spring blade into a stud at a given point producing a given frequency of vibration. The stud is thereafter inserted into a receiving device on the watchframe.

In the ordinary mechanical watch curb pins working radially on the outermost coil of the spring, are used to control the effective working length of the spring as the amplitude of the oscillator changes with positional changes of the watch when the spring comes into contact with the pins.

The operating frequency of the oscillator system can be defined by another method and that is by altering the inertia of the balance wheel by changing its centre of gyratory mass, this method is employed in watches of high quality and high precision. The oscillators in these watches or instruments are termed free sprung and have no curb pins.

In order to obtain optimum isochronic performance the spring must be mounted with the highest degree of accuracy in the oscillator mechanism. The spring must develop, that is dilate and contract in a regular concentric manner about the central axis of rotation of the oscillator and all the coils of the spring should remain within the same plane as one another perpendicular to the axis of rotation and parallel to the plane of the balance wheel. The coils therefore should not undulate out of plane in their development.

The conventional metal balance spring requires that the long side of its rectangular cross section is parallel to the balance wheel axis of rotation and the spring is pinned at its outermost fastening point in an aperture in the stud by a tapered pin or is glued or welded to the stud. The point at which the spring is attached to the stud and thus the length of the spring from its innermost attaching point at the collet on the balance staff to the outermost point at the stud, determines its operating frequency for a given fixed mass balance wheel. The attachment of the inner and outer ends of the spring cause intrinsic difficulties and the residual plasticity of the alloy does not prevent accidental bending and consequential misalignment which seriously affects the isochronic behaviour of the oscillator.

The operating frequency is conventionally finally determined once the spring and its associated balance wheel are introduced into the watch. The regulating of the watch is accomplished by altering the position of the curb pins along the balance spring allowing for increase or decrease in the active length of the spring and thus decreasing or increasing the oscillator frequency according to balance wheel amplitude.

The stud itself is conventionally mounted on a bracket or arm which allows the angular adjustment of its relative position. The stud arm has a common centre with the axis of rotation of the balance-wheel this brings the oscillator's dead point into correct relative position with the escapement. The stud and curb pins may conventionally turn together and maintain their relative positions.

The applicant has observed in the course of developing non magnetic oscillator systems from new materials, that new materials overcome many of the long standing intrinsic problems in manufacture and bring improved performance to the oscillator, see WO 2004/008259 and WO 2004/040943. These new materials have distinct and advantageous characteristics and demand new and improved technical considerations.

We learn from the applications EP1302821 and EP1256854 of the integration of the conventional collet with the spring on the one hand and the use of a micromoulding technique of carbon nano-fibre on the other. We learn from EP 1584994A and EP1513029 of further shapes of elastic rotatable configurations of collet in metal and non-metal material.

At its most general, the third aspect of the present invention proposes methods of attaching both the innermost part of the spiral spring without using a collet as is known in the conventional art and the outermost part of the spring of a fixed length and end portion shape by introducing appropriate attachment and adjustment devices for the balance spring. The spring has therefore a set frequency.

The invention may furthermore propose an exact and precise attachment of the balance spring to the balance staff and to the watch frame by eliminating the elastic split collet as in the conventional art. Necessary beat adjustment can be achieved by positioning the outermost end portion of the integral spring which is equipped for this purpose without the need to remove or interfere with the balance wheel, impulse roller or collet and without affecting the overall oscillator frequency.

The collet known in the art is defined in Berner, the standard horological industry reference dictionary as "4058 Collet: Small split cylinder fitted friction-tight to the balance staff".

In the case of this invention the spring is preferably cut e.g. using the technique described in the first aspect of the invention e.g. using a high precision laser technique from a planar piece of material to form a balance spring having its innermost attachment collar and/or (preferably and) its outermost attachment end portion shape formed integrally therewith. Preferably, the innermost attachment collar is shaped to prevent relative rotation between the spring and a balance wheel when the spring is mounted on the balance wheel. Preferably but not exclusively the spring is made from non-magnetically sensitive materials of low linear thermal expansion coefficient e.g. less than $6 \times 10^{-6} K^{-1}$ and preferably of density lower than 6.1 g/cm³.

The material may preferably though not exclusively be of any form or phase of carbon including synthetically derived diamond, polymer derived amorphous or vitreous carbon, graphite or continuous carbon fibre, or a composite or polymer or ceramic including metal oxide, dioxide, trioxide including synthetic corundums, carbide, silicate including glass, nitride or other in mono or poly crystalline form or in a hot pressed or reaction bonded form or combinations of these materials.

The preferred laser technique may also allow both the reduction in thermal impact on the spring and the control of ablated debris e.g. by fluid jet, fluid immersion, ice mounting, cold non-volatile gas jet or other suitable means.

The laser frequency and power are preferably selected to be able to cut or ablate in one or several passes over the material and may be angled or focused such that the resulting finished cut edge either is perpendicular to the planar surface of the original material sheet whereby the bias of the draft angle is compensated or imparts a symmetry to the spring cross-section about its middle axis and thus allows for the finished spring to dilate within the same plane.

The spiral spring may be made integrally with the balance wheel and or balance staff as is mentioned above, or may be formed separately therefrom, in which case the spring preferably has at its centre an annular collar.

To assemble the oscillator, the collar is positioned relative to the axis of rotation of the balance wheel and, when in the correct place, it is fused, glued, welded or otherwise fastened to fix the spring's absolute relative position to the balance wheel and its impulse pin. This may include the provision of one or more conveniently placed slots, holes or freedoms as to permit the sufficient elasticity to the balance staff girth to hold by friction the non-rotatable or rotatable collar in place on the balance staff itself, or on a separate collar which is then placed on the balance staff by the same means.

The separate collar may be so shaped as to have the integral spring and collar seated upon it and fastened as mentioned above, or may have an accurately made aperture into which the spring's innermost coil whether of regular spiral curve or other shape is fastened.

The slot or aperture in either the balance staff or collar for the purpose of attaching the innermost coil end being made by whatever appropriate means as seen fit which may include photon or ionic beam, mechanical, electrical, chemical, water precision material removal, techniques or a combination of these techniques.

The inner aperture of the collar may be shaped to prohibit its rotation around the balance staff or balance wheel hub in order to facilitate its precision positioning in the manufacturing and adjustment processes.

The balance spring preferably has an integral outer end (terminal) portion which is of the same height as the spiral spring but of greater overall width (radial extent).

The outer end portion (end plate) may be so shaped as to provide a passageway (channel) within which the spring blade is received to protect it against accidental shocks. The outer end portion may also provide a greater surface area for the spring's manipulation and introduction into the fastening device on the watch frame. The blind end of the passageway is where the spring begins and is the origin of the spring's effective working length.

The overall external contour of the end plate may follow that of a segment of an arc of a given radius from the balance spring centre. This segment of arc allows for this endplate to be fastened in the attachment device at one of any number of different points along its arc length without changing the radius of the point of attachment of the spring. The spring blade itself therefore need not come into contact and is not influenced by the attachment device.

This allows for the adjustment of the dead point of the oscillator or the beat of the watch, but does not interfere with its operating frequency and maintains the concentricity of the spring in relation to the central axis of rotation of the oscillator.

The present invention is intended to be used preferably but not exclusively in conjunction with an adjustable and inertia reducing balance wheel as is suggested in WO 2005/040943. The frequency adjustment is preferably independent of the pinning point of the spring, e.g. by altering the radius of gyration of the mass of the balance wheel.

In certain circumstances an alternative configuration for the endplate of the spring may include the shaping and adjusting, lengthening or shortening of the side cheeks of the endplate to control either or both the oscillator frequency and the balance amplitude. In this case the operating length of the spring and hence the oscillator frequency is determined at the spring to cheek contact point at the opening of the channel. This configuration provides a method of fine adjustment which may be required.

Furthermore a section of outer coil may be composed of material having a different value of elastic modulus damping from the rest of the coil. This can enable any mechanical shock to the watch frame to be damped and not conveyed to the spring. This outer section may be adhered, clipped, welded or otherwise fastened to the spring. The outer coil section may also preferably be of greater plasticity allowing for the small adjustments as may be required in correcting the spring after a severe shock. The additional outer coil section may preferably act in the same plane as the spring but is not limited to this.

The outermost part (end plate) of the spring is also preferably formed integrally with the spring. The geometry of the outermost end as described below may differ from conventional spring ends. Conventionally the end of the spring is of small rectangular section and the long side of the rectangle cross section is parallel to the axis of rotation of the oscillator. In the present invention the geometry of the outermost end of the spring may be of rectangular cross section but the long side of the rectangle cross section may be perpendicular to the axis of rotation of the oscillator. Furthermore the material area of the end of the spring may be greater than that previously known. The increased area allows for easier manipulation of the spring end in the processes of manufacturing, servicing and adjusting.

BRIEF DESCRIPTION OF THE DRAWINGS

Examples of the aspects of the invention discussed above are now described with reference to the accompanying drawings in which.

DETAILED DESCRIPTION OF THE INVENTION

Figure 1:
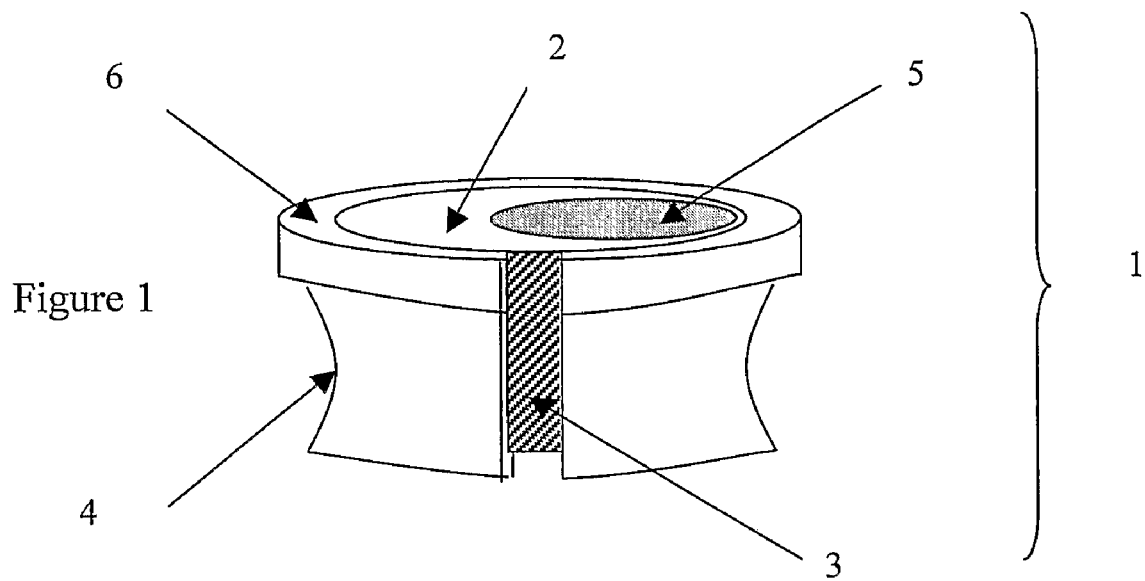
FIG. 1 illustrates a mass appendage assembly that is receivable in a balance wheel to form an embodiment of the invention.
Figure 2:
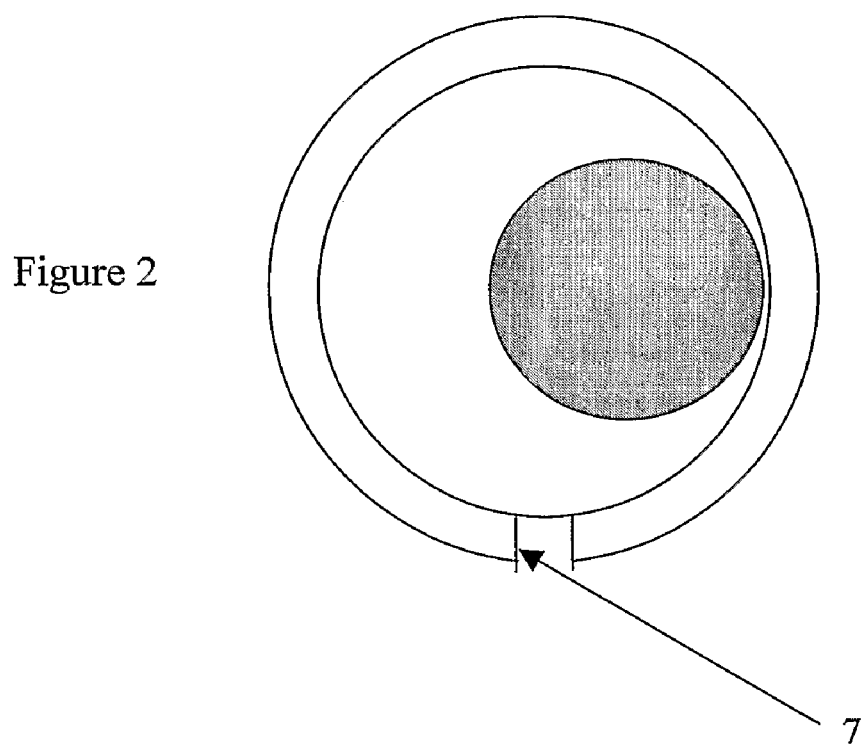
FIG. 2 is a top view of the mass appendage assembly show in FIG. 1.

FIG. 1 shows a mass appendage assembly 1 that comprises a regulating element 2 mounted in a cylindrical setting 6. The inner surface of the setting 6 and the outer surface of the regulating element 2 are in threaded engagement. The setting 6 has a split 7 down one side parallel to its axis. The inner diameter of the setting 6 is smaller than the outer diameter of the regulating element 2 so that when the regulating element is screwed into engagement with the setting 6, the setting 6 expands and the size of the split 7 increases. The thread 3 on the outer surface of the regulating member can be seen in FIG. 1. The split 7 can be seen in FIG. 2. The side wall of the setting 6 has a recess 4 cut into it. The mass appendage assembly 1 is designed to be let into a through hole formed on a balance wheel in a contracted (e.g. cool) state. Upon returning to its normal state, the walls of the setting expand and fit against the inner walls of the through hole to secure the mass appendage assembly 1 in the balance wheel. The regulating element 2 is constrained within the setting 6 by the elastic force of the setting 6 that tries to close the split 7.

To fine tune the appendage, a hole 5 may be bored into the regulating element 2. This can be done using a laser beam. The hole is bored eccentrically to the axis of the regulating element.

Figure 3:
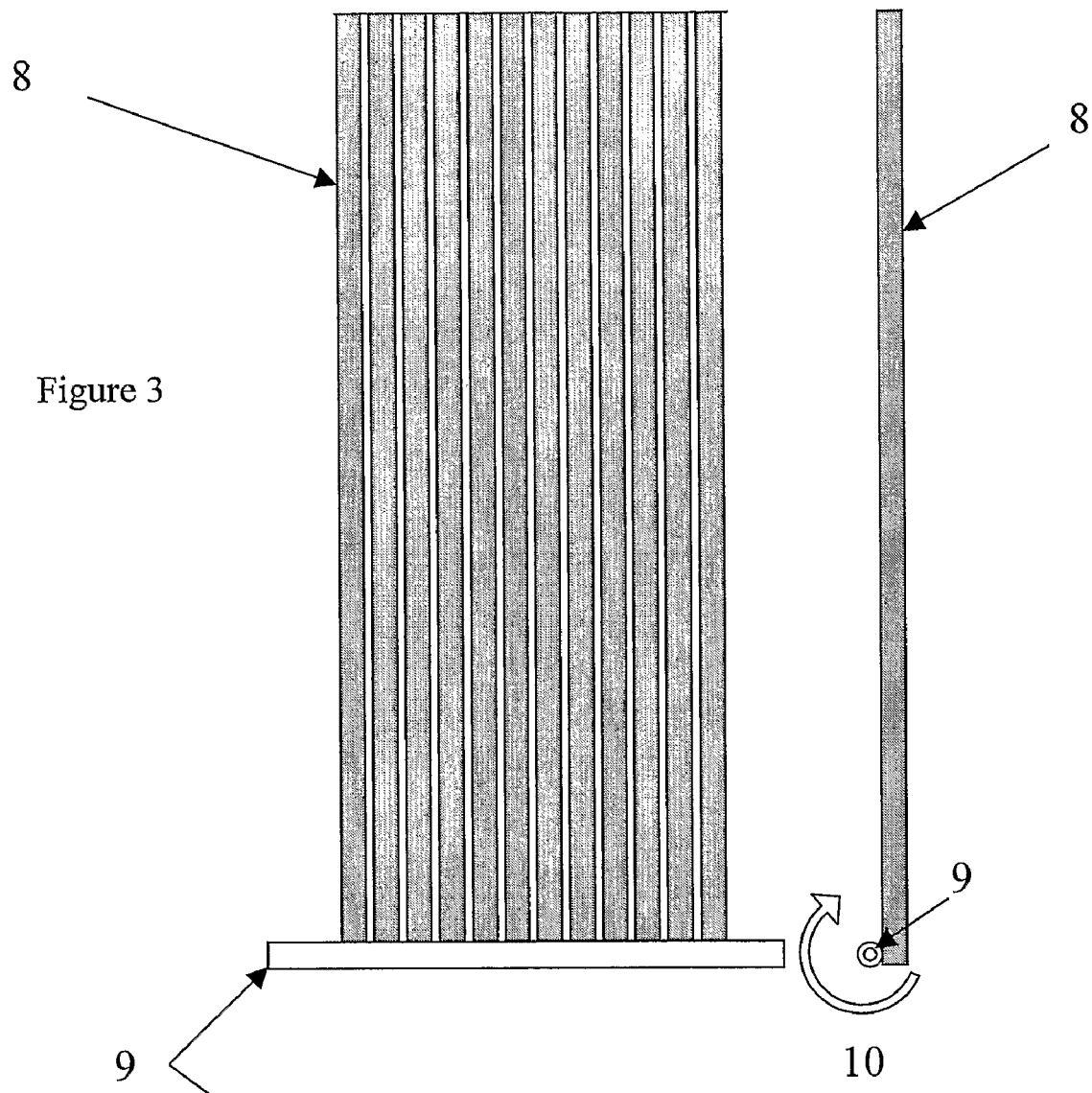
FIG. 3 shows apparatus for performing a method of manufacturing a balance spring that is an embodiment of the present invention.
Figure 4:
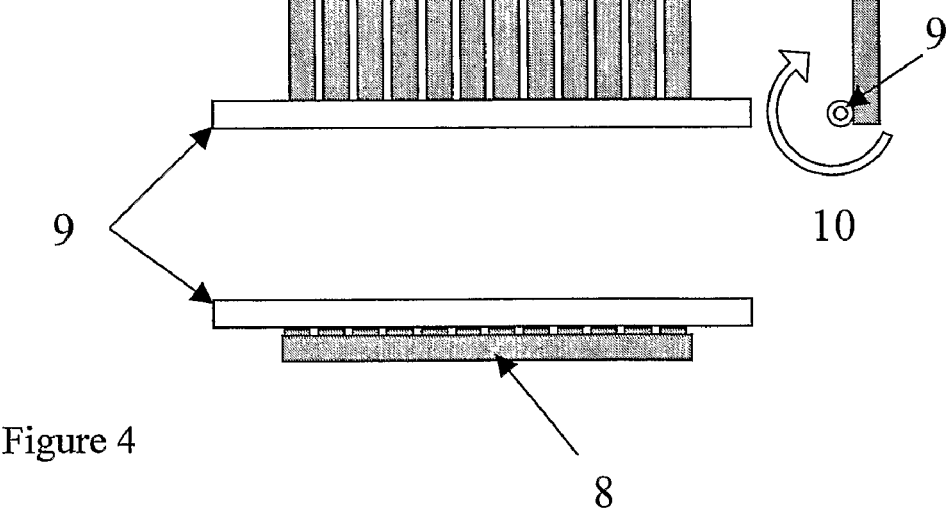
FIG. 4 shows a front view of the apparatus shown in FIG. 3.

FIG. 3 shows basic apparatus for forming a balance spring from non-magnetic material formed from a carbon precursor or ceramic (with or without fibre content). Here is sheet of interspacing material is formed with a plurality of channels along its length e.g. etched to its surface. Each channel receives material for forming the balance spring in its green state. A rod 9 is placed at one end of the interspacing sheet and attached to the balance spring material. The rod is then rolled to roll up the interspace sheet 8 so that each of the channels forms a spiral. The rolled up configuration is treated to transform the balance material from its green state to its final form. Further treatment follows e.g. to remove the interspace material and to separate the springs from one another and from the central rod if required.

Figure 5:
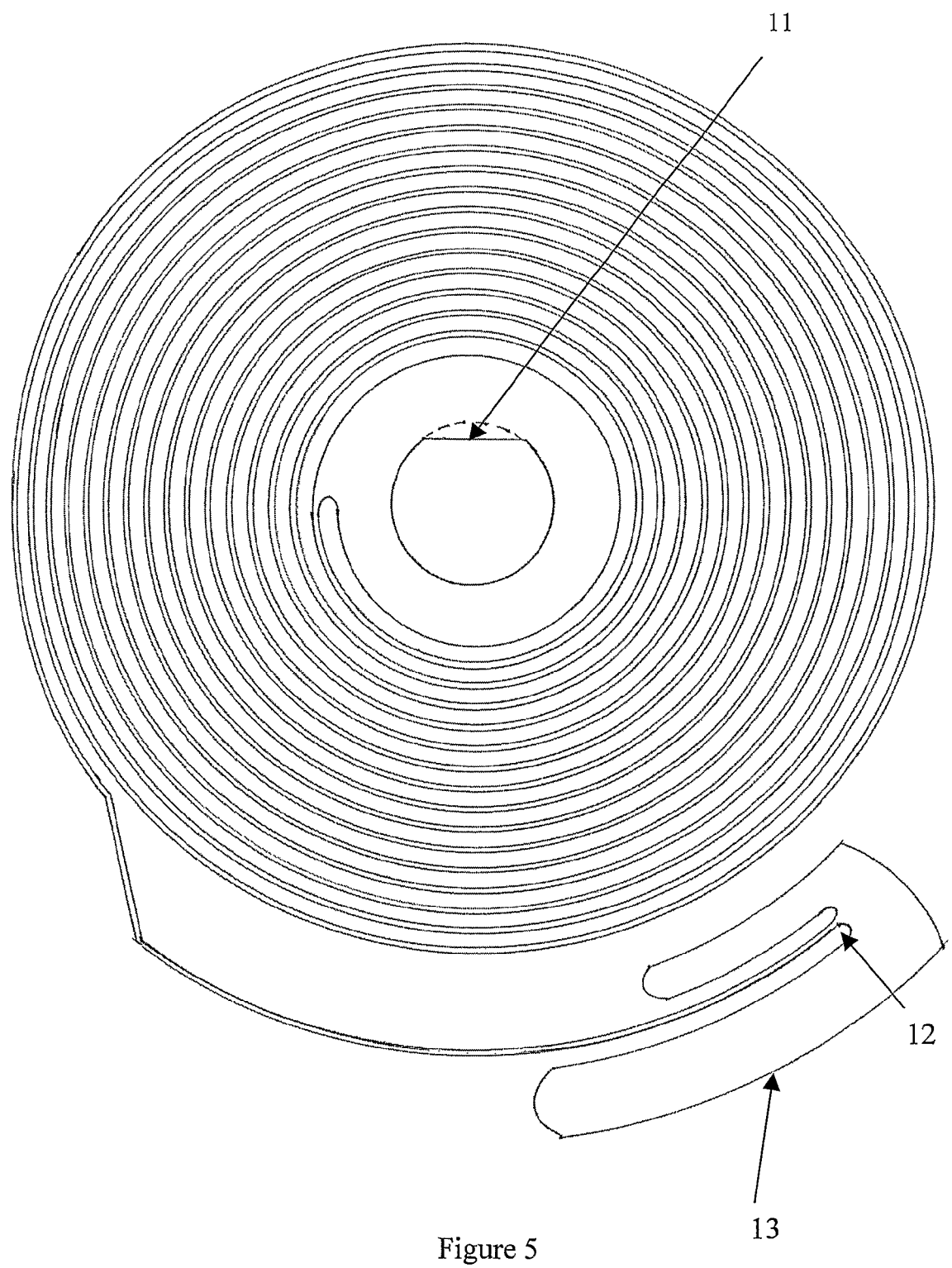
FIG. 5 shows a balance spring with integrally formed inner and outer attachment portions that is an embodiment of the present invention.

FIG. 5 shows a balance spring that is an embodiment of the present invention. The spring includes an innermost attachment part 11 in the form of a collar with a through hole e.g. receivable on a balance staff. A flattened side is provided on the through hole so that the inner attachment part is receivable on the balance staff having only one orientation to prevent rotation of the balance spring relative to the balance wheel.

Figure 6:
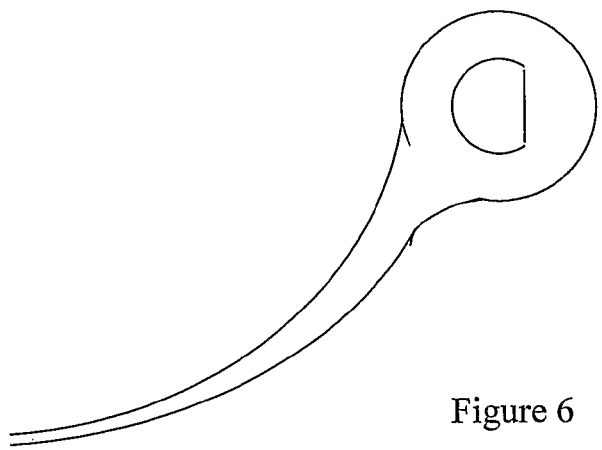
FIG. 6 shows a first non-rotatable inner portion for a balance spring.
Figure 7:
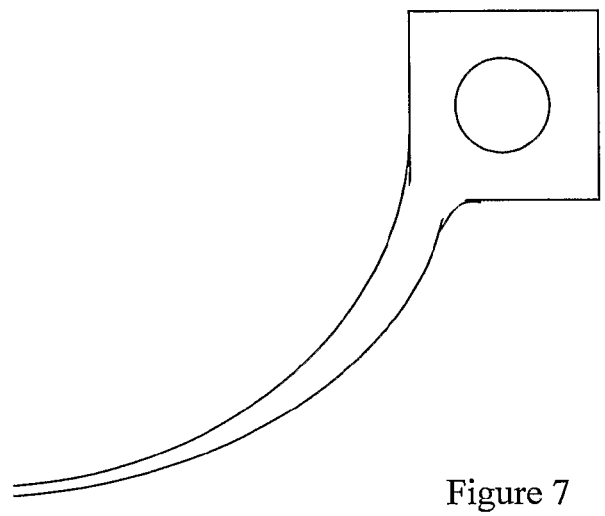
FIG. 7 shows a second non-rotatable inner portion for a balance spring.
Figure 8:
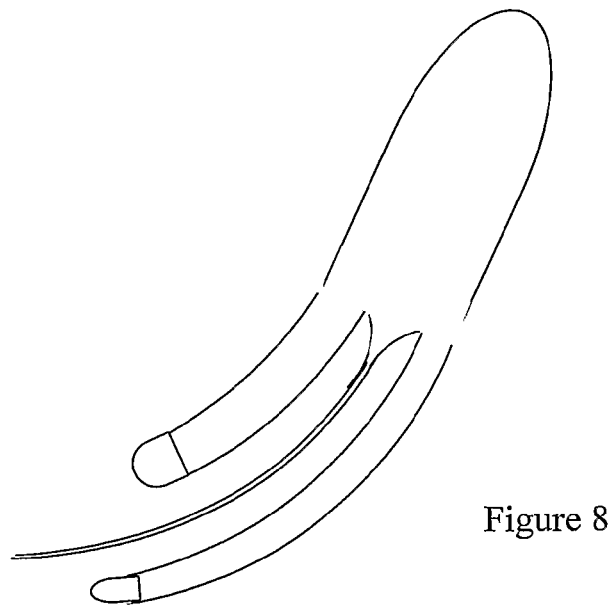
FIG. 8 shows an outer portion for a balance spring.

The balance spring also includes an outer attachment part 13 to be attached in an oscillator housing as explained below. The outer attachment part comprises a thickened portion that lies in the same plane as the balance spring. The thickened portion includes a recess for receiving the spring blade. The end of the spring blade is attached to the outer attachment part at the blind end 12 of the recess. The outer edge of the attachment part 13 lies on an arc segment whose centre is the centre of the balance spring. FIGS. 6, 7 and 8 show alternative configurations for the outer attachment part. In FIGS. 6 and 7, the outer attachment part is a collar similar to that shown as the inner attachment part in FIG. 5.

The outer end 13 of the spring occupies the same plane as the inner end and may be held in one or other of the devices shown in FIGS. 9, 10, 11 and 12. These devices allow for exactly the same height as the inner terminal portion 11 at the oscillator axis to be found by means of fine threaded adjustment between the body of the device and its seating in the balance bridge or device holding bracket or arm 14. The device may alternatively be seated in a setting and the setting may be an accurate sliding fit in a receiving aperture of the balance bridge or bracket and be secured in the appropriate position by a clamping screw 15. Furthermore the appropriate position may be found by the use of a micro adjustment of a radially mounted chamfered screw abutting on an inclined surface of the device or its setting permitting the fine height adjustment of the device.

Figure 11:
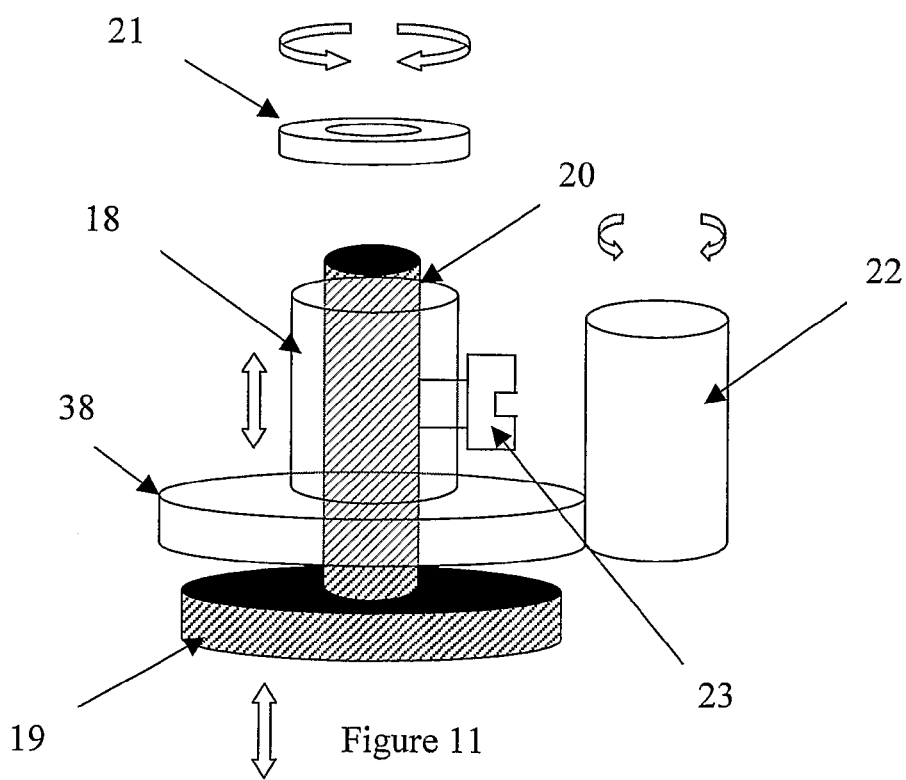

FIG. 11 shows a device comprising a tube 18 with a disc 38 attached at one end. The tube 18 and disc 38 have a bore which receives a rod 20. Another disc 19 is attached to the rod. The discs 19, 38 can be brought to close upon one another by drawing up rod 20. The outer surface of rod 20 is finely threaded and is received by a nut 21. Rotating the nut 21 relative to the outer cylindrical surface of rod 20 causes up or down movement of disc 19. Alternatively rod 20 may be a threaded screw acting on a threaded inside surface of tube 18; disc 19, which is captive with but free to remain non-rotating relative to rod 20 as the rod 20 is turned may be drawn up in this way. This action can clamp the balance spring end part between the two discs 19, 38.

Fine radial adjustment may be made by the interaction of a pinion by 22 acting on a toothed or partially toothed surface of the edge of disc 38. The teeth are not shown in the drawing. The tube 18 and pinion 22 can be held by their threaded outer surfaces in the balance bridge or bracket arm.

Although discs are shown here, the clamping of the spring end may be accomplished using alternative shapes. The securing of the tube 18 in the balance bridge or bracket may be accomplished by the use of a screw 23.

Figure 12:
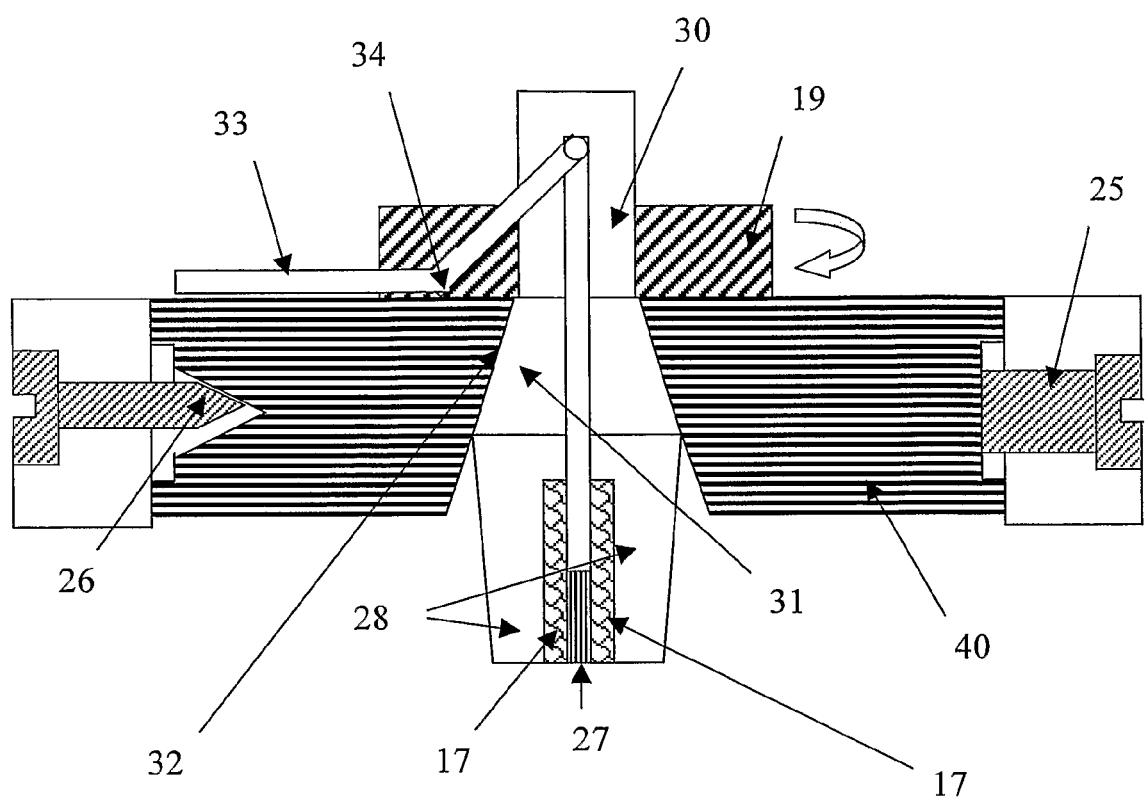

Alternatively the screw 23 may have a chamfered end, as shown in FIG. 12 and may be used to draw discs 19, 38 together where disc 19 is unthreaded and is of sliding fit in tube 18, disc 19 having a suitably positioned and dimensioned hole to receive the screw 23 using the principle described for screw 26 below.

The device shown in FIG. 12 may allow for a conventional spring orientation e.g. upright end part 27, but further allows for the fastening of the new material as described above. The principle is a miniature vice whose jaws 28 (which having a lining 17) are brought together by the upward drawing of the central body 31 by a fine threaded collar or nut 19 acting on a threaded cylindrical upper section 30 of the central body, here shown in bisected view in elevation. A chamfered portion of the central body 31 is compressed by the abutment with the chamfered section 32 of a setting 40, and the sprung jaws 28 are consequently brought together. The reverse occurs when unscrewing the threaded collar. An alternative arrangement may be that the central body may be lifted by an angled lever 33 which is attached at the upper most end of the central body the angled section of which acts as a fulcrum 34 against the adjacent upper plane of the part in which the central body is located thus closing the jaws.

The outer end of the balance spring may be as in FIG. 5, 6, 7 or 8, and may be so formed as to permit the fastening into the appropriate attachment device with the correct orientation of the spring.

The choice of attachment device for the outermost end of the spring is dependent on the spring end-shape chosen. The internal contour of the attachment device corresponds with the contour of the end-shape, so once the correct height has been found, the spring is located and secured in the device.

Once the outermost spring end is held in the attachment device, the device itself and its holding bracket may be further adjusted in the x, y and z axis to provide fine adjustment of concentricity, height and dead point and thus optimum performance of the spring.

Figures 9, 10:
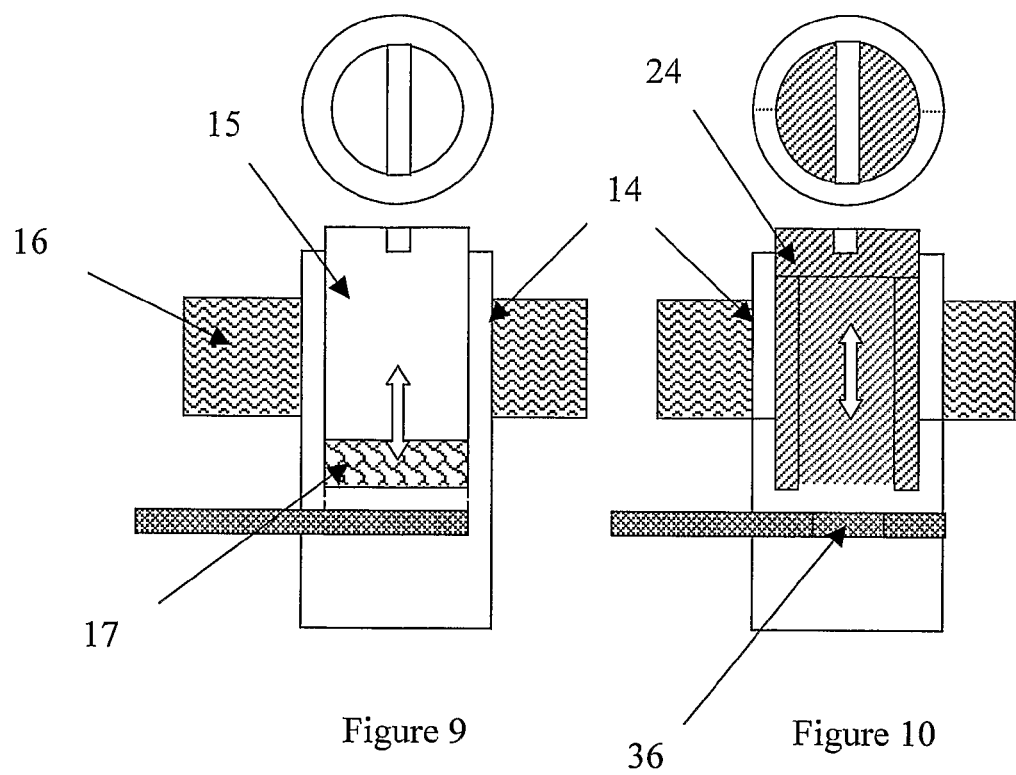
FIGS. 9 to 12 show devices for securing the outer attachment portion of a balance spring in an oscillator mechanism.

As shown in FIGS. 9 and 10, the attachment device may be let into the balance bridge or a bracket for the purpose, either the whole device or a part such as the inner cylindrical screw portion 15, which may be threaded into an appropriately shaped aperture in the balance bridge 16 itself. The balance bridge thus forms the body of the attachment device. In this configuration the recessed slot to receive the spring end plate in the balance bridge is sympathetically radiused to receive the spring end plate's identical radius. This maintains the concentricity of the spring but also allows for the oscillator's dead point adjustment.

An intermediary sleeve may also be used between the spring and the receiving recessed slot, the sleeve may have an engaging or abutting element or portion which may be used in conjunction with a fine regulating device to allow for the fine regulating of the dead point.

The outermost end as with the innermost end may be collar shaped as shown in FIGS. 6 and 7 with or without an irregular inner contour which allows its correct positioning on a similarly shaped shallow post in the attachment device 36.

The shape of the outermost end can most expediently be fitted to the shape of the attachment device so that the spring is held correctly on assembly in the same plane as the innermost end and with predetermined concentricity which is here further enabled by the precision of the laser machining process.

The attachment device or part of the device 24 or exposed contact parts with the spring's outermost end with the attachment device may be made of, coated with or lined with a material 17 which enhances the frictional contact and shock resistance between the attachment device and spring end. This material may be a polymer or a natural or other synthetic material which is inert to the chemical, thermal or other changes in its working and servicing environment.

The invention claimed is:

1. A method of forming a balance spring for a horological oscillator mechanism comprising the steps of:
    forming one or more layers of non-magnetic balance spring material, the spring material being ceramic or any form of carbon;
    generating a precision laser beam to penetrate the layer or layers and cut therethrough; and
    directing the precision laser beam at the layer or layers, causing relative movement therebetween, and thereby cutting out with the laser beam from the layer or layers of spring material a balance spring comprising a flat spiral having a plurality of coils and a non-elastic inner attachment part attachable at the centre of the coils, and wherein the layer or layers of spring material cut away from the spiral comprises a spiral shape.

2. A method according to claim 1, wherein the layer or layers are cut so that the inner attachment part is formed integrally with the coils.

3. A method according to claim 1, wherein the laser beam cuts out the central space of the spiral so that the outermost coil remains attached to the layer of spring material.

4. A method according to claim 3 including, after the balance spring is cut from the spring material, coating the coils and/or the inner attachment part with a ceramic or carbon or polymer material.

5. A method according to claim 1, wherein the spring material is a plurality of stacked layers.

6. A method according to claim 1, wherein the spring material is a substantially isotropic sheet having a plane substantially perpendicular to the laser beam.

7. A method according to claim 6 including, after the spiral is cut from the spring material, cutting one or more spiral-shaped layers from the sheet of spring material using a second laser beam that is substantially parallel to the plane of the sheet.

8. A method according to claim 1, wherein the laser beam is stationary and the spring material is movable relative to it.

9. A method according to claim 1, wherein the laser beam is generated from any one of a cooled deep cutting excimer laser, a YAG laser, a copper vapour laser, and a CO2 laser.

10. A method according to claim 1 including the step of cutting, with the precision laser beam, a through hole in the non-elastic inner attachment part which leaves the inner attachment part un-split.

11. A method according to claim 10 wherein the step of cutting, with the precision laser beam, the through hole in the inner attachment part includes the cutting of a flattened side of the through hole.

* * * * *